March 20, 1934.    C. W. VALENTINE ET AL    1,951,715
UNIFORM SPEED REEL
Filed July 23, 1931    7 Sheets-Sheet 1
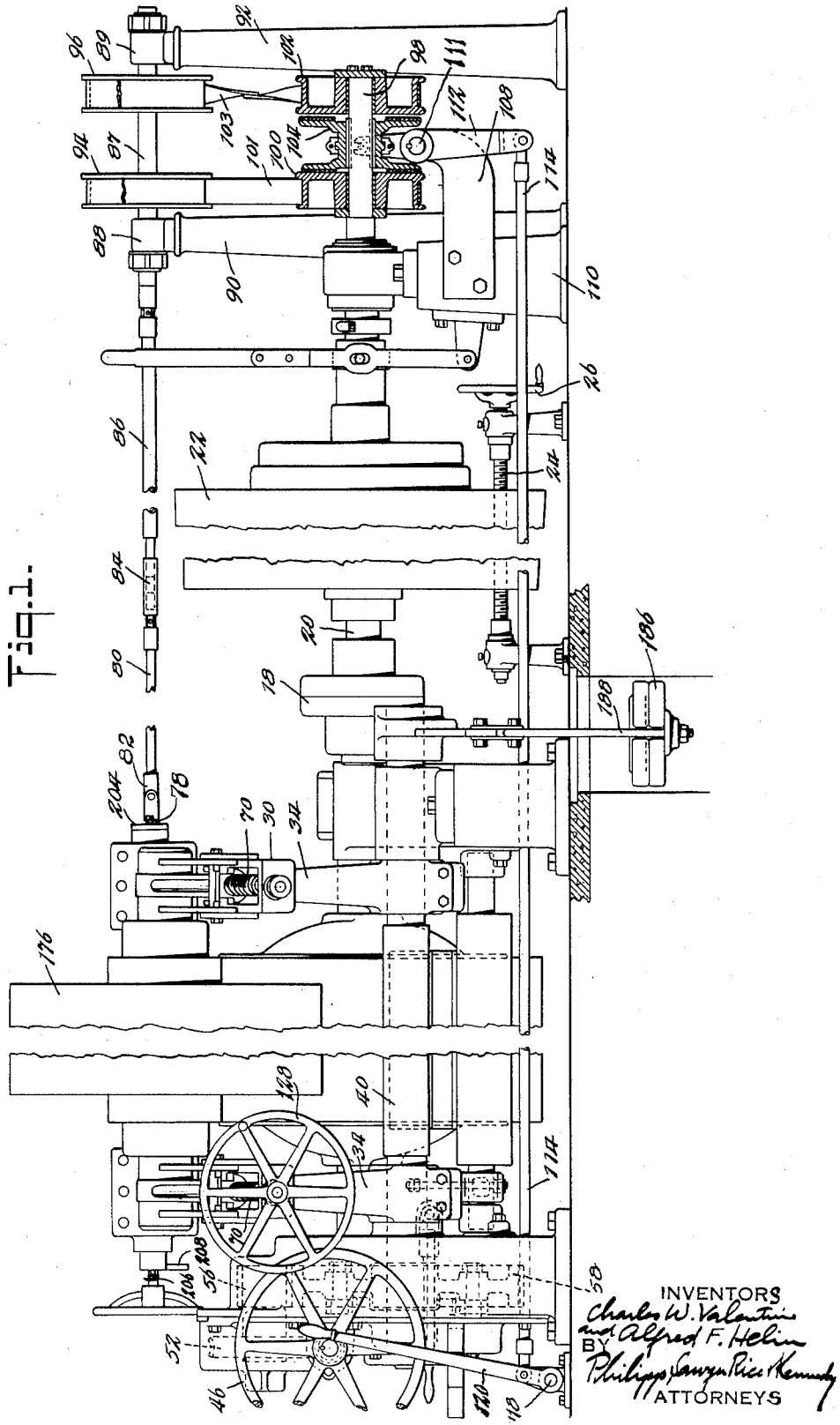

March 20, 1934.    C. W. VALENTINE ET AL    1,951,715
UNIFORM SPEED REEL
Filed July 23, 1931    7 Sheets-Sheet 2
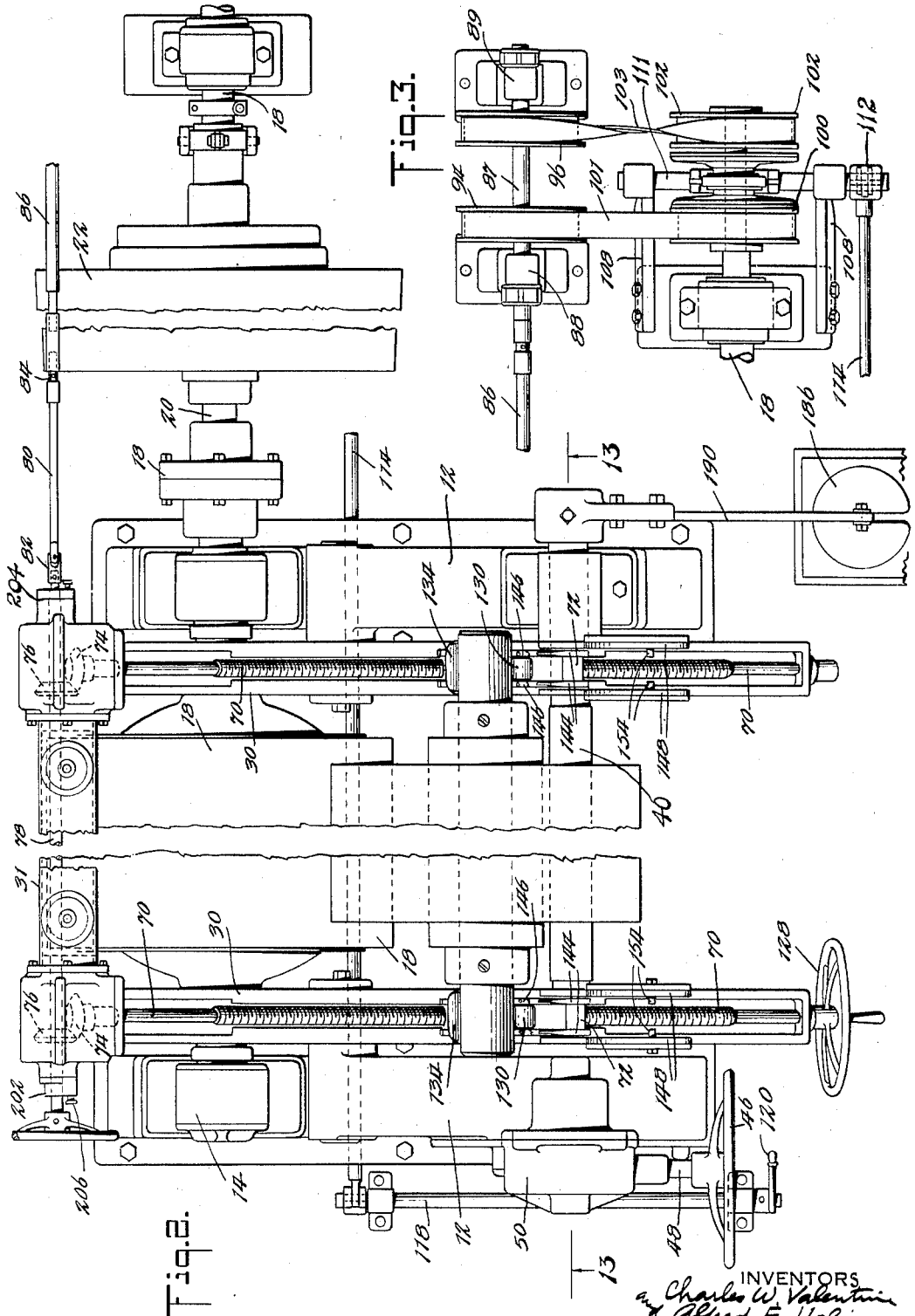

March 20, 1934.  C. W. VALENTINE ET AL  1,951,715
UNIFORM SPEED REEL
Filed July 23, 1931   7 Sheets-Sheet 3

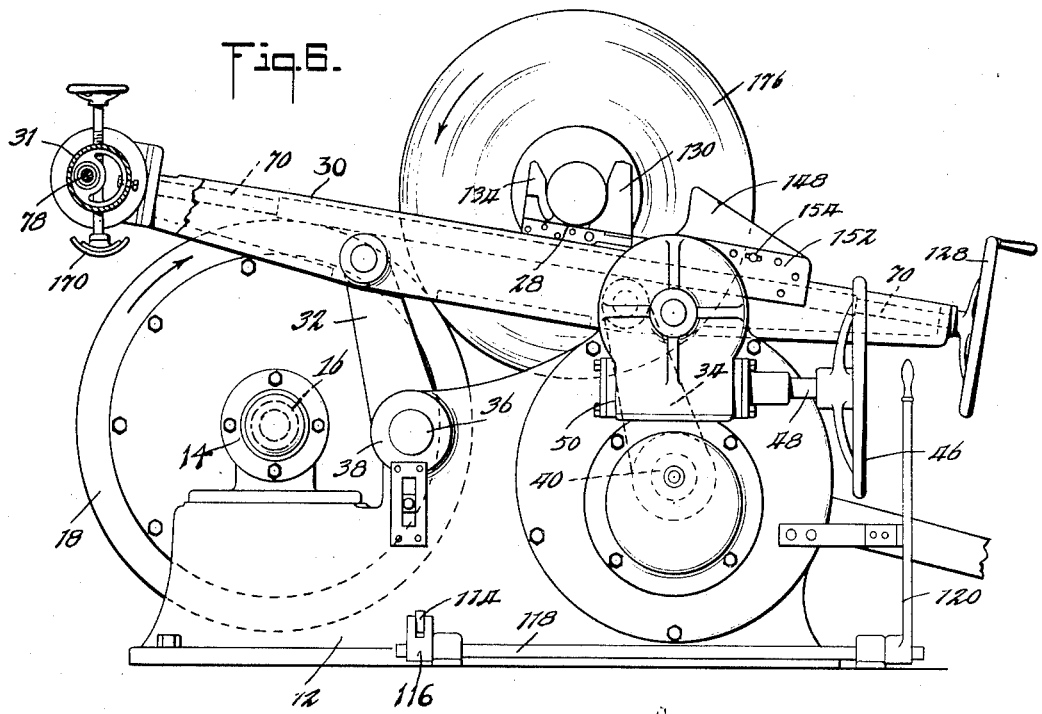
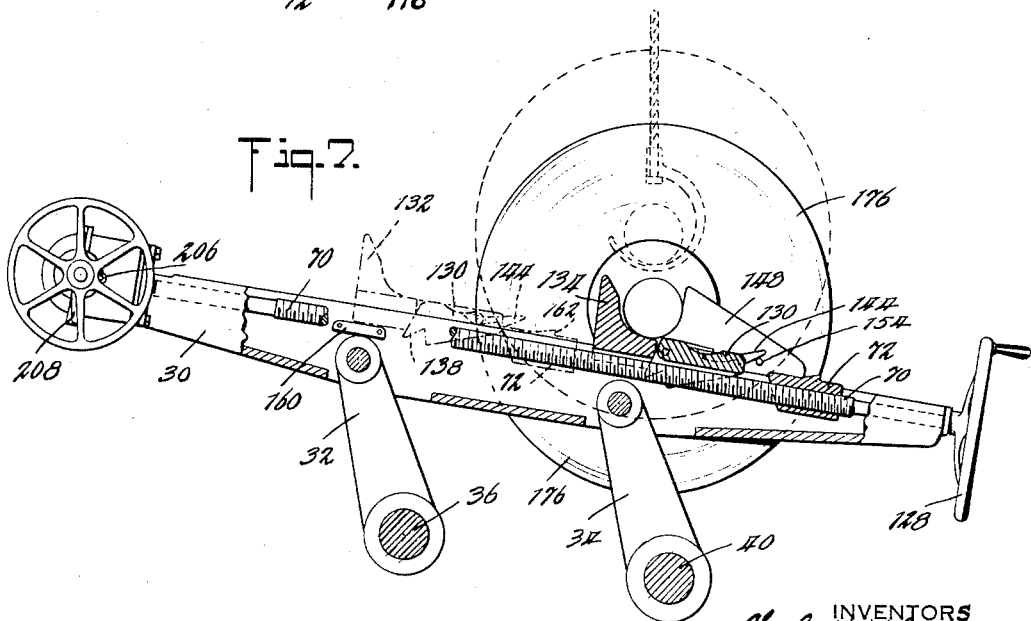

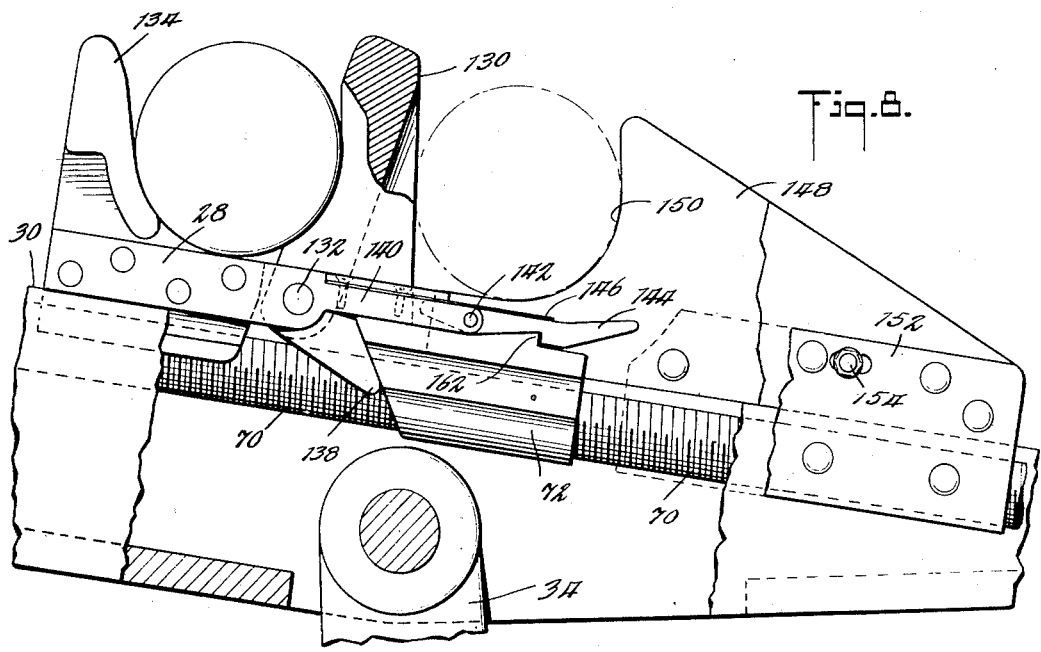

March 20, 1934.  C. W. VALENTINE ET AL  1,951,715
UNIFORM SPEED REEL
Filed July 23, 1931   7 Sheets-Sheet 6

INVENTORS
Charles W. Valentine
Alfred F. Helm
BY
Philipp, Sawyer, Rice & Kennedy
ATTORNEYS March 20, 1934. C. W. VALENTINE ET AL 1,951,715
UNIFORM SPEED REEL
Filed July 23, 1931 7 Sheets-Sheet 7
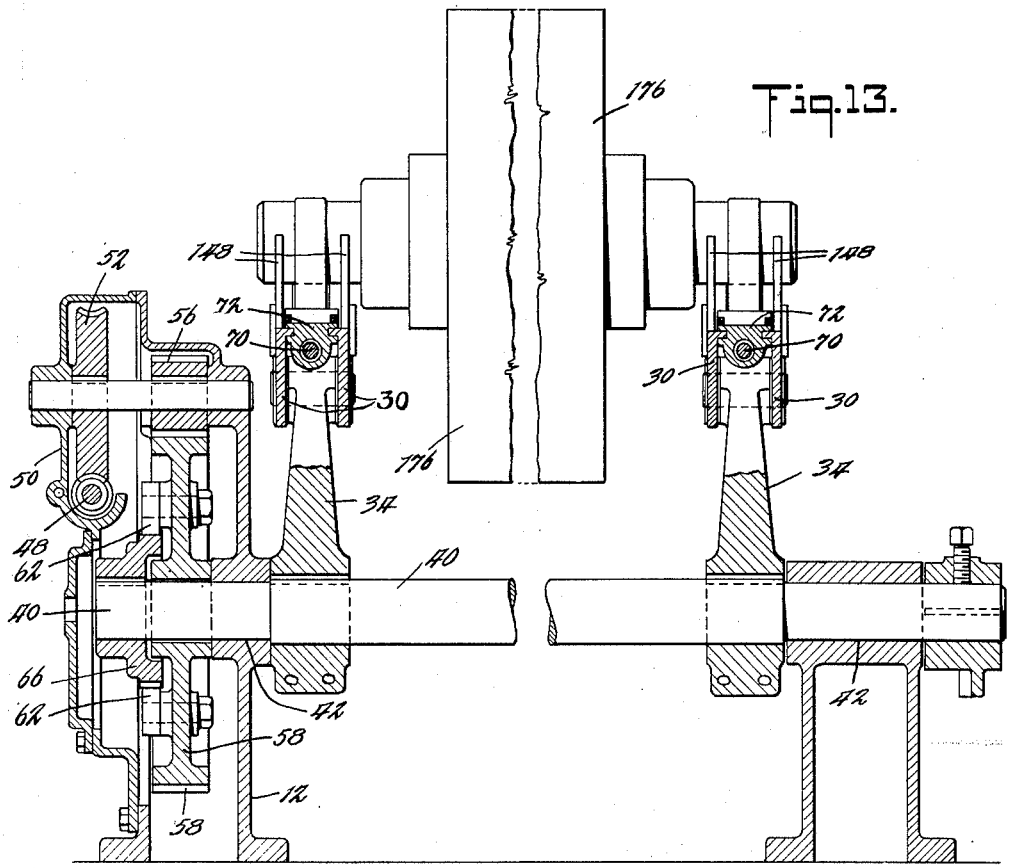
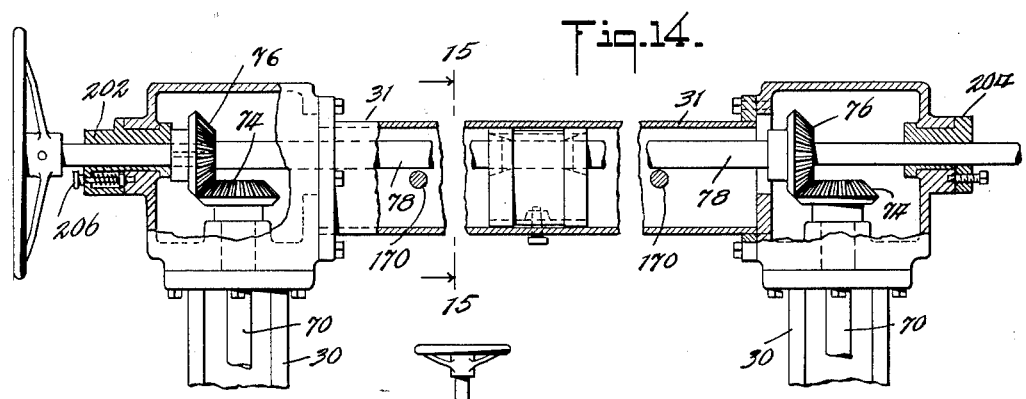
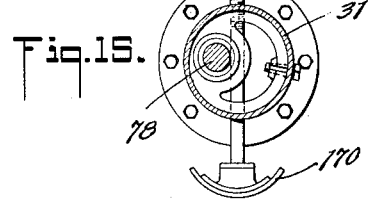

Patented Mar. 20, 1934

1,951,715

UNITED STATES PATENT OFFICE 1,951,715

UNIFORM SPEED REEL

Charles W. Valentine and Alfred F. Helin, Watertown, N. Y., assignors to the Bagley and Sewall Company, Watertown, N. Y., a corporation of New York Application July 23, 1931, Serial No. 552,594

13 Claims. (Cl. 242—65)

This invention relates to paper winding mechanism and, more particularly, to reels for winding paper upon a drum as it comes in a continuous sheet from the paper machine and the calenders. The general object of all such mechanisms is to provide for starting the sheet on an empty drum when one drum has been wound with paper to the desired diameter, with as little loss of time and paper as possible, in changing from one drum to the next.

The wound drum with its roll of paper is usually carried away from the reel by overhead cranes, the roll thereafter being usually run through slitters upon winders where rolls cut accurately to the desired length are wound for shipping.

Various forms of paper winding mechanism or reels to accomplish the above general object are known. As distinguished from the type of reel providing a plurality of drums, generally known as multiple drum stack reels, and usually driven by a slip belt to keep the tension on the sheet regardless of the size of the winding roll, the present invention is directed more particularly to that type of paper winding mechanism known as the uniform speed reel or English type reel, where the roll of paper being wound is driven by being in contact with a revolving driving drum which runs at the same speed as, or slightly faster than, the sheet of paper coming from the calenders.

It is an object of the present invention to provide in a paper winding mechanism of the uniform speed reel type a novel drum-handling mechanism in which a substantially uniform pressure is automatically maintained between the winding paper roll and the uniform speed driving drum.

Another object is to provide means for securing and maintaining perfect alignment between the driving drum and the winding reel drum.

Another object is to provide a convenient rapid traverse control for bringing an empty drum into winding position.

Still another object is to provide in connection with the novel drum-handling mechanism, means for selectively varying or setting the substantially uniform pressure between the winding paper roll and the uniform speed drum, thereby providing for winding either hard or soft rolls as may be desired.

A further object is to provide a rapid traverse power control capable of very rapidly handling the winding drum.

A still further object is to provide a construction capable of accomplishing all of the foregoing objects without sacrificing one in order to accomplish another, and in which the sheet may be easily and quickly transferred from a finished roll to an empty drum without causing variation of important settings and adjustments such as alignment, maintenance of uniform pressure and maintenance of set amount of pressure between the winding roll and the uniform speed drum.

The invention consists in certain arrangements and mechanism for carrying out the foregoing objects and will be described in connection with the accompanying drawings illustrating, by way of example, a preferred embodiment of the invention, and in which:

Figure 1 is a rear elevation of a uniform speed reel with driving and control mechanism constructed in accordance with the invention;

Figure 2 is a top plan view thereof with the extreme right hand portion broken away;

Figure 3 is a top plan view of the extreme right hand portion of Figure 1;

Figure 6 is a similar view illustrating the position of parts when the drum has been wound with paper to the desired diameter and is ready for removal from the reel;

Figure 7 is a side elevation of part of the reel mechanism showing the drum-handling devices in more detail;

Figure 8 is a fragmentary view thereof, partly in section and illustrating the parts in the position which they occupy when an empty drum is about to be placed in paper winding position;

Figure 9 is a similar view showing in full lines the position of the parts when the new or empty drum has been positioned in its bearings for winding;

Figure 13 is a vertical sectional transverse view through the reel taken substantially on the line 13—13 of Figure 2;

Figure 14 is a top plan view partly broken away and illustrating the drum-bearing actuating mechanism at the forward end of the reel; and Figure 15 is a vertical sectional view taken on the line 15—15 of Figure 14.

Figure 4:
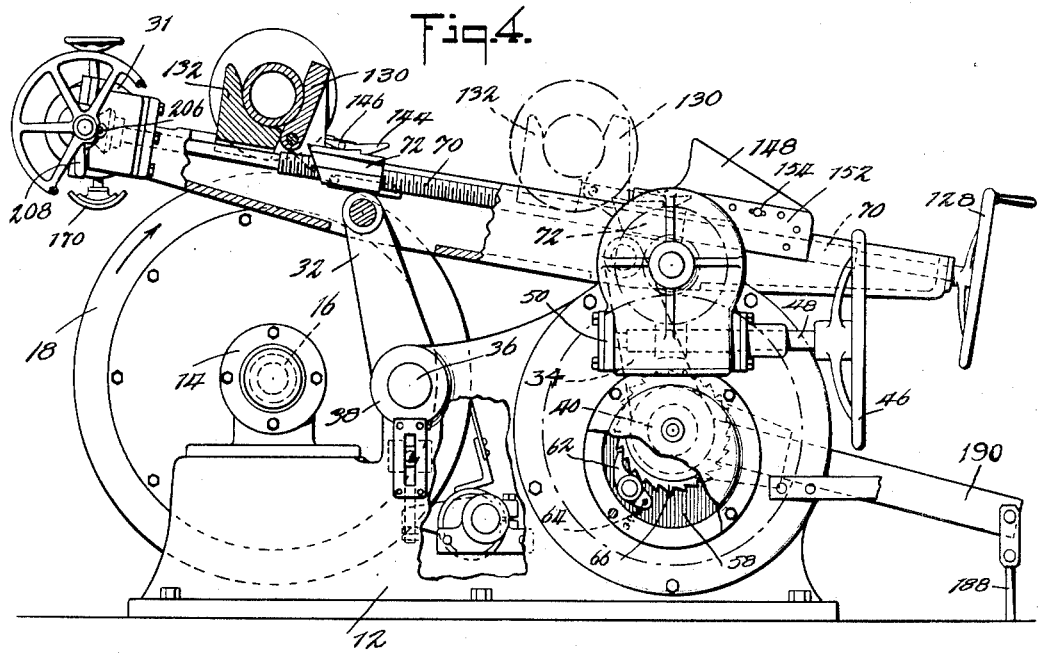
Figure 4 is a side elevation of the reel, partly broken away, viewed from the left of Figures 1 and 2, and illustrating the parts in one position.

Referring in detail to the drawings, the reel framing includes side frames 12 and carries at its forward end aligned bearings 14 of the shaft 16 of a large driving drum 18. The shaft 16 is connected by a coupling 18 to a driving shaft 20, fast on which is a cone pulley 22, whose driving belt is adjusted and maintained in adjusted position by a belt guide on a worm shaft 24, which is operated by a belt guide hand wheel 26.

In accordance with the invention, rapid actuating and controlling mechanism is provided for moving a pair of bearing members in which is carried the drum upon which the paper is to be wound. As illustrated in the drawings, these bearing members 28 are aligned axially, one member being on each of a pair of parallel guide tracks 30, whose forward ends are rigidly connected by a shaft housing 31.

Each track is supported by a pair of links on the reel frame, the forward link 32 being pivoted at its upper end to the track 30 and the rear link 34 being similarly pivoted at its upper end to the track. The lower ends of the forward links 32 are fast upon a horizontal shaft 36 parallel to the uniform speed drum shaft 16 and rotatably mounted in bearings 38 formed in or carried by the side frames 12 of the reel. The rear links 34 are fast upon a shaft 40 parallel to shaft 36 and rotatably mounted in bearings 42 carried by or formed in the side frames 12 of the reel.

The invention provides control mechanism for the shaft 40 by which the shaft is given a rotational movement, thereby, through links 34, raising and lowering the parallel guide tracks 30 arcuately toward and away from the driving drum 18 for the purpose of bringing the winding drum in bearings 28 into predetermined relation with the periphery of the driving drum, and, in the form illustrated, this mechanism includes a hand wheel 46 fast on a short horizontal wormshaft 48 rotatably mounted in a worm gear housing 50 carried by one of the side frames 12, the worm shaft 48 being permanently in mesh with a worm gear 52 fast on a short rotatable worm gear shaft, to which is fixed a pinion 56 permanently in mesh with a gear wheel 58. The gear wheel 58 may conveniently be rotatably mounted on the shaft 40, and preferably carries mechanism to actuate the shaft 40 for arcuately raising and lowering the parallel guide tracks 30, this mechanism being constructed to permit the guide tracks to ride upwardly on their supporting links, as the roll of paper builds up on the winding drum, without disturbing the actuating mechanism of shaft 40, which mechanism remains idle during the upward movement of the guide tracks caused by the increasing diameter of the paper roll.

In the form illustrated (Figs. 4 and 13) this mechanism includes a pair of pawls 62 carried by and projecting from one face of the gear wheel 58 and held by springs 64 in operative engagement with a ratchet 66 which is keyed to shaft 40, the arrangement being such that, as viewed in Fig. 4, the ratchet may move clockwise idly past the pawls but clockwise movement of the pawls will necessarily cause clockwise movement of the ratchet.

Counter-clockwise movement of the gear wheel 58 and pawls 62, as viewed in Fig. 4, will be accompanied by corresponding movement of ratchet 66, and, consequently, of the shaft 40, due to the weight of the parallel guide tracks 30 and the weight carried thereby, said movement being due to the fact that the track supporting links extend upwardly away from the vertical plane containing the axis of rotation of the shaft 40.

It will be evident that, with the foregoing construction, rotation of the hand wheel 46 may cause a raising or lowering of the parallel guide tracks 30, and that with no movement of the pawls 62, the parallel guide tracks 30 may be raised by the building up of paper on the winding drum, whose shaft is thereby being moved slowly away from the driving drum, thus, through bearings 28, lifting the track frame. During this movement the ratchet 66 rides idly past the stationary pawls.

The mechanism provided for moving the winding drum bearings in set alignment along the guide tracks 30 includes a pair of screw-threaded or worm shafts 70, each rotatably mounted within a guide track 30, and each carrying, in threaded engagement therewith, a bearing actuating traversing nut 72 which is guided by the track 30, when it is moved therealong by the rotation of threaded shaft 70.

Each shaft 70 has fixed thereon at its forward end a bevel gear 74 in mesh with a cooperating bevel gear 76 fast on a horizontal shaft 78 extending transversely through the shaft housing 31 rigidly connecting the forward ends of the guide tracks 30. Rotation of shaft 78, therefore, through traversing nut 72, causes the winding drum bearings 28 to move forwardly or rearwardly along the guide tracks 30 in unison and in axial alignment, without any variation in their relation to each other and without variation in the bearing axis alignment with the driving drum 18.

The invention provides rapid actuating and controlling mechanism for rotating shaft 78 in either direction, for the purpose of moving the winding drum bearings along their tracks. In the form shown, this mechanism includes a short connecting shaft 80 connected at one end with shaft 78 by a telescoping universal joint 82 and connected at its other end by a telescoping universal joint 84 to a shaft 86 axially aligned with and driven by a pulley shaft 87 rotatably mounted in fixed bearings 88, 89, carried by a pair of standards 90 and 92. Two belt-driven pulleys 94 and 96, alternatively operable, are fast on pulley shaft 87.

A driving power shaft 98 is axially aligned with and driven by the cone pulley shaft 20, and carries loosely a pair of driving pulleys 100, 102, provided with inner opposed clutch faces, alternatively engageable by a clutch member 104 slidable on and rotatable with the driving power shaft 98. Driving pulley 100 is connected to pulley 94 by a straight belt 101 and driving pulley 102 is connected with pulley 96 by a crossed belt 103, so that shaft 87, and consequently bevel gear shaft 78, is rotated in one direction or the other, depending upon which driving pulley clutch face is engaged by clutch member 104. Rotation of bevel gear shaft 78 in one direction causes the traversing nuts 72 to travel forwardly and in the opposite direction causes them to travel rearwardly along the guide tracks 30, thus moving the winding drum bearings 28 along their guide tracks, as hereinafter described.

The invention provides controlling means for moving the clutch member 104 into engagement with one or the other of driving pulleys 100 or 102, and in the form illustrated, this means includes brackets 108 projecting from a shaft supporting standard 110 and pivotally carrying a rock shaft 111, on which is fixed a rocking lever 112, whose upper end is rotatably attached to the clutch member 104 and to whose lower end a horizontal shift rod 114 is pivotally attached. The horizontal shift rod 114 extends transversely through the lower part of the reel frames and is pivotally connected with a short rocker arm 116 fast on a lever shaft 118 carried by bearings on the reel side frame and rockable in one direction or the other by a vertically extending shift lever 120. Rocking of shift lever 120 in one direction or the other, therefore, through the mechanism described, causes rapid movement of the traversing nuts 72, and consequently of bearings 28, in one direction or the other along the guide tracks 30.

A hand wheel 128 is fixed on one end of one of the screw-threaded traversing shafts 70, and may be used to move one of said shafts without causing corresponding movement of the other, when the gear shaft 78 is moved as hereinafter described to bring the bevel gears 74 and 76 out of mesh. In this way, one of the winding drum bearings 28 may be moved in either direction along its track for the purpose of aligning the bearings 28 axially with respect to each other and to the axis of rotation of the driving drum 18.

Figure 5:
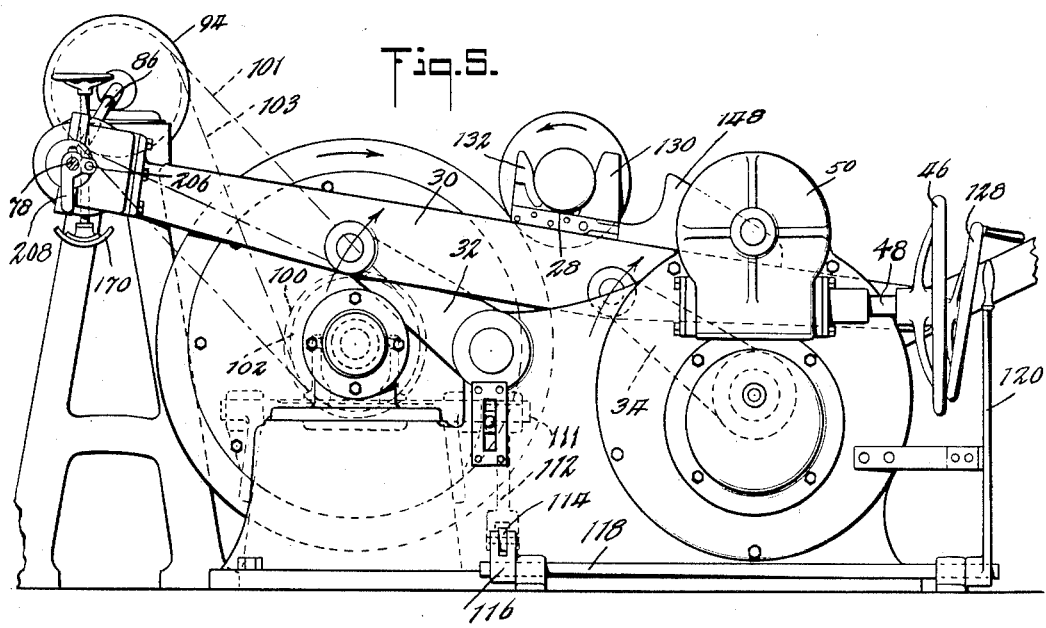
Figure 5 is a similar view illustrating the parts in the position which they occupy when the paper sheet begins to wind upon a new drum.
Figure 10:
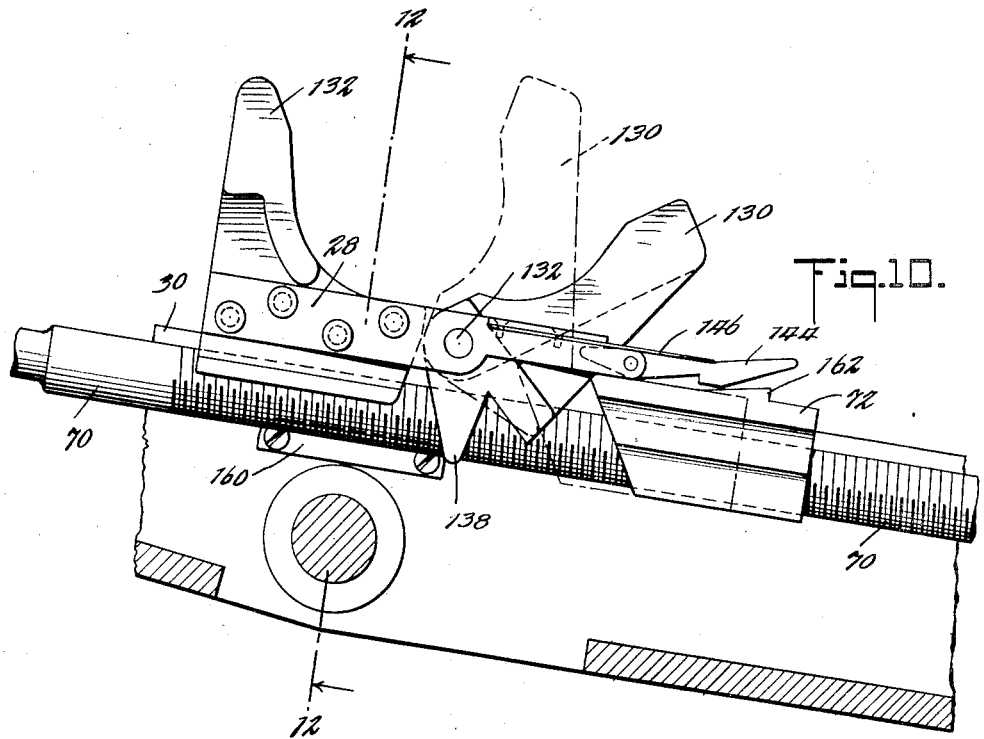
Figure 10 is a similar view of one of the traversing bearings showing the parts in one position.
Figure 11:
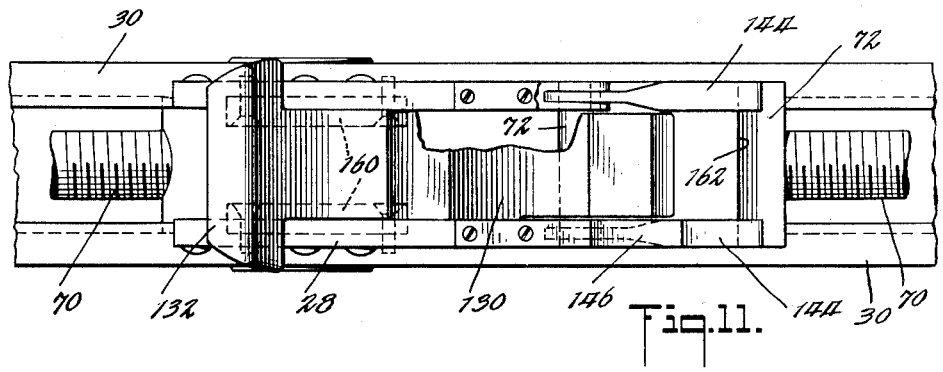
Figure 11 is a top plan view thereof.
Figure 12:
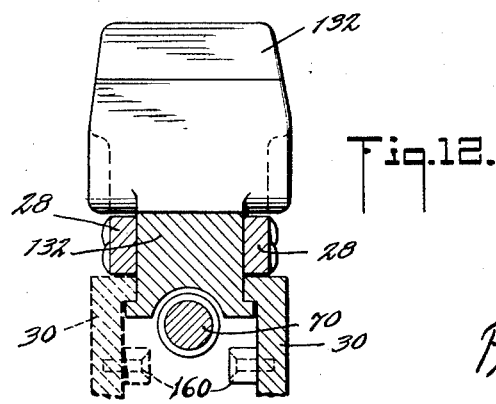
Figure 12 is a vertical sectional view taken on the line 12—12 of Figure 10.

For the purpose of bringing bevel gears 74 and 76 out of mesh (Figures 5 and 14), the gear shaft 78 is mounted to rotate in eccentric bushings 202 and 204. The eccentric bushing or bearing 202 is provided with a detent 206 engageable with the adjacent gear housing to fix the position of the bearing. When this detent is disengaged from the gear housing the eccentric bearing 202 may be rotated by moving its lever handle 208, thus moving bevel gear 76 out of mesh with bevel gear 74, whereupon the screw-threaded traversing shaft 70 which is provided with hand wheel 128 may be rotated for the purpose of moving one of the bearings 28 without moving the other.

In accordance with the invention, the traversing nuts 72 cooperate with the winding drum bearings 28 in such a manner that movement of the traversing nuts in either direction will cause corresponding movement of the winding drum bearings; also when the desired quantity of paper has been wound upon the winding drum, movement of the traversing nuts 72 rearwardly will cause rearward movement of the winding drum bearings to a predetermined point, whereupon the rear half or jaw of each winding drum bearing moves clear of the winding drum shaft, allowing said shaft to be supported in a fixed bracket bearing. The forward half of the movable winding drum bearing remains stationary, though the traversing nuts may continue rearwardly some distance. While the wound drum in the fixed brackets is removed from the reel mechanism, for example by an overhead crane, the movement of the traversing nuts 72 is reversed and they move forwardly, thus moving the winding drum bearings forwardly to a predetermined point at which the lower rear half or jaw of each bearing, which was moved clear, is restored to its former position, these bearings being now ready to receive a new or empty winding drum.

Referring now to the illustrated and present preferred embodiment of means for accomplishing the foregoing, Figures 7-11, each bearing 28 has two jaws, the jaw 130 being pivoted at 132 to its cooperating jaw 134. The jaw 130 is provided with a re-entrant angle portion 133 forming a shoulder 136 and also forming a cam projection 138. The traversing nut 72 is shaped at its forward end to enter and fit in this re-entrant portion and, in the position of Figure 8, to support movable jaw 130, in fixed relation to bearing jaw 134, with the shoulder 136 of the movable jaw resting upon the top face of the traversing nut. The jaw portion 134 is provided with a rearward extension 140 which carries pivotally at its outer end, as at 142, a latch lever 144 normally held to the position of Figure 8 by a flat spring 146 so that the latch locks the bearing 28 to the traversing nut. When the parts are in the position of Figure 8, rearward movement of the traversing nut will, through latch 144, move the bearing 28 rearwardly, and forward movement of the traversing nut 72, thrusting against the re-entrant portion of pivoted jaw 130, will move the bearing 28 forwardly along its guide track. In cooperative relation to each bearing 28 is a fixed winding drum supporting bracket 148 having a half bearing portion 150 for the shaft of the winding drum. Projecting from a plate 152, fixed on the track, is a latch lifting pin 154 which lies in the path of travel of the latch 144. When the traversing nut has traveled rearwardly a sufficient distance the cam face of latch 144 contacts with the pin 154, which thus cams the latch upwardly about its pivot 142, thereby disengaging the latch, and consequently the whole bearing structure 28, from the traversing nut 72 which may continue its rearward movement for a short distance as indicated in Figure 9. The release of the latch occurs when, or substantially when, the movable jaw 130 has reached a point where the winding drum shaft is supported in the fixed bracket bearings 150, which lie within the paths of travel of movable jaws 130. Further rearward movement of the bearing 28 is prevented by the winding drum shaft in the fixed bracket bearing. Continued rearward movement of the traversing nut 72 carries it out of the re-entrant portion 133 of the movable jaw 130 so that the shoulder 136 of the movable jaw is no longer supported by the traversing nut, whereupon the movable jaw 130 drops downwardly by gravity about its pivot 132 and occupies the full line position of Figure 9, straddling the screw shaft 70, further downward movement being prevented by the cam projection 138 which abuts against a cooperating surface of the other bearing jaw 134, but extends below or clear of such surface for the purpose of causing the return of the movable jaw 130 to the position of Figure 8, as hereinafter described.

With the parts in the position of Figure 9, the winding drum is rotatably supported in fixed bearing brackets 148 and may be removed therefrom by an overhead crane provided with hooks for lifting engagement with the projecting ends of the winding drum shaft, as indicated in Figure 7. The bearings 28, with their jaws in the position of Figure 9, are now ready to be moved along the track 30 to their forward position on the reel, as shown in Figure 4.

This movement is accomplished by rapid forward movement of the traversing nuts 72, which move forwardly from the position of Figure 9 until each engages the free end of one of the pivoted jaws 130. Further forward movement of the traversing nut, thrusting against the jaw end, moves the bearing 28 forwardly along the track 30 until the projection 138 encounters a fixed lug 160 (Fig. 7) carried by the track which, upon further thrusting movement of nut 72, cams the movable jaw 130 upwardly from the position of Figure 9 to the position of Figure 4, the forward edge of the nut 72 riding under the shoulder 136 when the movable jaw 130 has been cammed upwardly about its pivot 132 high enough to permit the traversing nut to travel under the shoulder and into the re-entrant portion 133. When the nut has reached the inner end of the re-entrant portion of the movable jaw the latch 144 locks the parts in position, having ridden up the cam face 162 of the nut and being snapped down behind this cam face by the spring 146. In the forward position of Figure 4 the bearing 28 is ready to receive a new or empty winding drum.

When the winding operation is initially started, bearings 28, in the position of Fig. 4, receive the shaft of a winding drum. Hand wheel 46 is operated to raise or lower the guide tracks 30 and the traversing nuts 72 are moved to shift the bearings 28 on the guide tracks to bring the winding drum into contact with the driving drum at the selected or desired position on the driving drum. By varying the position of contact the amount of pressure between the two drums may be regulated. Rotation of hand wheel 46 is stopped when the tracks have been lowered to bring the winding drum into selected position. The paper sheet from the paper machine passes under the spreaders 170, over the driving drum and under and around the winding drum which, rotated by the driving drum, builds upon itself the paper roll. During the building up of the roll the tracks are free to lift as the roll grows larger, the weight of the mechanism and the paper roll holding the paper roll in driving contact with the driving drum 18.

When the paper roll has reached the desired size, lever 120 is moved to cause rapid movement of bearings 28 rearwardly down their tracks until the shaft of the full winding drum is supported by the fixed brackets 148. Shift lever 120 is now rocked to reverse the direction of travel of the traversing nuts 72, thereby returning the bearing to its forward position (Fig. 4) to receive a fresh or empty winding drum without disturbing the full winding drum which is being supported in the fixed brackets.

The fresh or empty drum in the bearings 28 is now brought into winding contact with the driving drum 18 and the paper sheet thereupon begins to wind upon this fresh winding drum, the full drum being removed from the brackets, and the hand wheels 46 and 128 being actuated to bring the new winding drum into proper position against the periphery of the driving drum 18. In addition to regulating the pressure with which the winding drum bears upon the driving drum, by moving the winding drum up or down upon the periphery of the driving drum, this pressure may also be varied and regulated by counterweights 186 suspended on a vertical rod 188 pivotally attached to a substantially horizontal counterweight arm 190 fixed on shaft 40.

It will be evident that, within the scope of the appended claims, other power mechanism may be provided than the straight and crossed belts herein shown.

What is claimed is:

1. In a winding mechanism, winding drum driving means, parallel tracks, winding drum bearing members movable therealong, auxiliary winding drum bearing members in cooperative relation therewith, and traversing transfer mechanism for delivering a winding drum carried by said first-named bearing members into supported relation in said auxiliary bearing members by moving said movable bearing members on said tracks.

2. In a winding mechanism, a driving drum, parallel tracks movable toward and away from said driving drum, winding drum bearing members movable on said tracks, auxiliary winding drum bearing members in fixed relation to said tracks and in cooperative relation with said movable bearing members, and traversing transfer mechanism for delivering a winding drum from said first-named bearing members into the auxiliary bearing members by moving said first-named bearing members along said tracks.

3. In a winding mechanism, a driving drum, a pair of parallel tracks, winding drum bearing members movable thereon, auxiliary winding drum bearing members in cooperative relation therewith, and rapid traversing transfer mechanism for delivering a winding drum from said first-named bearing members to said auxiliary bearing members by moving said first-named bearing members on said tracks, said rapid traversing mechanism being reversible and, on reversing, moving said first-named bearings empty away from said auxiliary bearing members, leaving said winding drum in the latter.

4. Winding mechanism including a driving drum, movable winding drum bearing members, each including relatively movable bearing sections, auxiliary winding drum bearing members in cooperative relation therewith for receiving a winding drum therefrom, and rapid traversing transfer mechanism cooperating with said first-named winding drum bearing members and movable in two directions for bringing said first-named bearing members into winding-drum-delivering relation to said auxiliary winding-drum bearing members, causing drum-releasing relative movement of said bearing sections, and restoring said first-named bearing members empty to drum receiving position with their bearing sections in drum-carrying relation.

5. Winding mechanism including a driving drum, movable winding-drum bearing members for carrying a winding drum in winding relation to said driving drum, each of said bearing members including sections movable to drum-carrying relation and drum-releasing relation, auxiliary winding-drum bearing members cooperating therewith for receiving a winding drum therefrom, and rapid traversing transfer mechanism cooperating with and moving said first-named winding-drum bearing members in two directions, movement thereof in one direction delivering a drum from said first-named bearing members to said auxiliary bearing members and bringing the sections of each bearing member into drum-releasing relation, and movement thereof in the opposite direction bringing said first-named bearing members into drum-receiving position and thereby restoring the sections of each bearing member to drum-carrying relation.

6. Winding mechanism including a driving drum, movable winding-drum bearing members for carrying a winding drum in winding relation to said driving drum, each of said bearing members including a pair of sections movable to drum-carrying relation and drum-releasing relation, auxiliary winding-drum bearing members in cooperative relation therewith for receiving a winding drum therefrom, and rapid traversing transfer mechanism for causing relative movement between said first-named winding-drum bearing members and said auxiliary winding-drum bearing members and including a traveling member cooperating with each of said first-named winding-drum bearing members and lockable thereto, said traveling members being movable in unison in either of two directions on operation of said rapid traversing mechanism, said traveling members by movement in one direction delivering a winding drum from said first-named bearing members to said auxiliary bearing members, each unlocking itself from its cooperating bearing member and bringing the sections thereof into drum-releasing relation, and said traveling members by movement in the other direction bringing said first-named bearing members into drum-receiving position, each locking itself to its cooperating bearing member, restoring the sections of the latter to, and locking them in, drum-carrying relation.

7. In a winding mechanism, a driving drum, a first pair of winding drum carrying members for rotatably carrying a winding drum in winding relation to said driving drum, a second pair of winding drum carrying members for carrying the winding drum in a position out of winding relation with said driving drum, means for moving one of said pairs toward the other, and mechanism operable by such movement effecting a winding drum's release from one of said pairs to the other.

8. In a winding mechanism, a driving drum, winding-drum carrying members for carrying a winding drum in winding relation to said driving drum, each of said carrying members including sections relatively movable into drum-carrying relation and into drum releasing relation, a movable mounting for said carrying members, means for varying the relation of the mounting to said driving drum, shifting means for causing relative movement of said carrying members with respect to said mounting, both of said means cooperating to vary the position of said carrying members peripherally with respect to said driving drum, and devices cooperating with said shifting means for bringing the sections of said carrying members alternatively into drum-carrying relation and drum-releasing relation.

9. Winding mechanism including a driving drum, a pair of parallel tracks, winding-drum bearing members movable along said tracks for carrying a winding drum in winding relation to said driving drum, each of said bearing members including sections relatively movable to drum-carrying relation and drum-releasing relation, auxiliary winding-drum bearing members carried by said tracks, and rapid traversing transfer mechanism associated with said tracks for moving said first-named bearing members therealong to and from said auxiliary bearing members and changing the relation of said sections.

10. Winding mechanism including a driving drum, a pair of parallel tracks, winding-drum bearing members movable along said tracks for carrying a winding drum in winding relation to said driving drum, each of said bearing members including sections relatively movable to drum-carrying relation and drum-releasing relation, auxiliary winding-drum bearing members carried by said tracks, and rapid traversing transfer mechanism associated with said tracks for moving said first-named bearing members therealong to and from said auxiliary bearing members and changing the relation of said sections, and track controlling apparatus for moving said tracks with respect to said driving drum.

11. Winding mechanism including a driving drum, parallel tracks, winding-drum bearing members movable therealong, auxiliary winding-drum bearing members in cooperative relation therewith, track controlling apparatus for moving said tracks with respect to said driving drum, and rapid traversing transfer mechanism carried by said tracks for delivering a winding drum from said first-named bearing members to said auxiliary bearing members by moving said first-named bearing members along said tracks, said rapid traversing mechanism having power-actuated driving means connected therewith in a plurality of positions of said tracks with respect to said driving drum.

12. Winding mechanism including a driving drum, bearing members for supporting a winding drum in operative relation thereto and each including a pivoted section movable to drum-releasing position and drum-retaining position, auxiliary bearing members for receiving a wound drum from said first-named bearing members, rapid traversing mechanism for moving said first-named bearing members to effect wound drum delivery therefrom to said auxiliary bearing members and including a traveling device cooperating with each of said pivoted sections in both positions of the latter, each traveling device supporting its cooperating section in its drum-retaining position and withdrawing its support upon said wound drum delivery, thereby effecting movement of its cooperating section to drum-releasing position.

13. Winding mechanism including a driving drum, bearing members for supporting a winding drum in operative relation thereto and each including a pivoted section movable to drum-releasing position and drum retaining position, auxiliary bearing members for receiving a wound drum from said first-named bearing members, rapid traversing mechanism for moving said first-named bearing members to effect wound drum delivery therefrom to said auxiliary bearing members and including a traveling device cooperating with each of said pivoted sections, each traveling device supporting its cooperating section in its drum-retaining position and withdrawing its support upon said wound drum delivery, thereby effecting dropping movement of the section to drum releasing position, means limiting the drop of each section, and section engaging elements cooperating with each traveling device to return each of said pivoted sections to drum-retaining position after said wound drum delivery for the reception by said first-named bearing members of an empty winding drum.

CHARLES W. VALENTINE.
ALFRED F. HELIN.